(12) United States Patent
Shirouzu (10) Patent No.: US 7,438,101 B2
(45) Date of Patent: Oct. 21, 2008

(54) PNEUMATIC TIRE WITH TREAD HAVING BLOCKS

(75) Inventor: Toshimichi Shirouzu, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 39 days.

(21) Appl. No.: 10/933,299

(22) Filed: Sep. 3, 2004

(65) Prior Publication Data

US 2005/0109437 A1 May 26, 2005

(30) Foreign Application Priority Data

Nov. 26, 2003 (JP) ............................. 2003-395924

(51) Int. Cl.
*B60C 11/12* (2006.01)
*B60C 11/13* (2006.01)

(52) U.S. Cl. ............................. 152/209.15; 152/209.17; 152/209.21; 152/DIG. 3

(58) Field of Classification Search ............ 152/209.15, 152/209.17, 209.18, 209.21, 902, DIG. 3
See application file for complete search history.

(56) References Cited

U.S. PATENT DOCUMENTS

| | | |
|---|---|---|
| 4,854,358 A | 8/1989 | Takeuchi |
| 4,955,415 A | 9/1990 | Takeuchi et al. |
| 5,031,680 A * | 7/1991 | Kajikawa et al. ........ 152/209.21 |
| 5,957,180 A * | 9/1999 | Kuramochi et al. .... 152/DIG. 3 |
| 2002/0124922 A1 | 9/2002 | Carra et al. |
| 2004/0069389 A1* | 4/2004 | Ratliff, Jr. .............. 152/209.15 |
| 2004/0256041 A1* | 12/2004 | Ratliff, Jr. .............. 152/DIG. 3 |

FOREIGN PATENT DOCUMENTS

| | | | |
|---|---|---|---|
| JP | 1-215603 | * | 8/1989 |
| JP | 3-57704 | * | 3/1991 |
| JP | 2001-121926 | * | 5/2001 |
| JP | 2001-146104 | * | 5/2001 |
| JP | 2001-191736 A | | 7/2001 |
| JP | 2001-322407 | * | 11/2001 |
| JP | 2001-354011 | * | 12/2001 |
| JP | 2001-354011 A | | 12/2001 |
| WO | WO 03/013881 | * | 2/2003 |

* cited by examiner

*Primary Examiner*—Steven D Maki
(74) *Attorney, Agent, or Firm*—Birch, Stewart, Kolasch & Birch, LLP (57) ABSTRACT

The present invention aims to improve the wet performance while securing steering stability and holding down degradations in noise performance to minimum, and for this purpose, a pneumatic tire in which blocks are disposed at intervals at a tread portion thereof is arranged in that concave blocks with stepped concave portions that extend along block side edges, which face circumferential main grooves, and having a depth from a block top surface that corresponds to 20 to 70% of a block height are provided. The concave portions have a length in a tire circumferential direction of 40 to 95% of a length of the block side edges in the tire circumferential direction and a width in a tire axial direction of 2 to 20 mm.

9 Claims, 7 Drawing Sheets

PNEUMATIC TIRE WITH TREAD HAVING BLOCKS

This Nonprovisional application claims priority under 35 U.S.C. §119(a) on Pat. application No(s). 2003-395924 filed in Japan on Nov. 26, 2003, the entire contents of which are hereby incorporated by reference.

BACKGROUND OF THE INVENTION

1. Field of the Invention

The present invention relates to a pneumatic tire in which the provision of stepped concave portions at side edges that extend along circumferential main grooves of blocks has lead to securement of steering stability and to improved wet performance while restricting decrease in noise performance.

2. Description of the Prior Art

Tread portions are usually formed with tread grooves composed of circumferential main grooves extending in a circumferential direction of a tire and lateral grooves in directions orthogonal thereto. By setting a groove width of the tread grooves, and particularly a groove width of the circumferential main grooves, to be large, improvements in drainage properties and wet performance are achieved. However, an increase in groove width also exhibits the drawback in that it leads to inferior pattern rigidity that causes degradations in steering stability and increases in tire noises.

In such a manner, there exists a contradicting relationship between wet performance and noise performance as well as steering stability, and it is strongly being wanted for an advent of tires with both features being improved, and particularly to radial tires for use in passenger cars.

SUMMARY OF THE INVENTION

The present invention thus aims to provide a pneumatic tire that is created on the basis of forming stepped concave portions of specified sizes at side edges that extend along circumferential main grooves of blocks, and that is capable of improving the wet performance while securing steering stability and while restricting decreases in noise performance to minimum.

For achieving this object, the invention according to a first aspect of the present application is a pneumatic tire in which blocks, which are partitioned through circumferential main grooves extending in a circumferential direction of the tire and lateral main grooves in directions orthogonal thereto, are disposed at intervals at a tread portion, wherein the blocks include, at block side edges that face the circumferential main grooves, concave blocks including stepped concave portions extending along the block side edges, wherein the concave portions have a depth ha from a block top surface that corresponds to 20 to 70% of a block height H0 of the concave blocks, a length La of the concave portions in the tire circumferential direction that corresponds to 40 to 95% of a circumferential length L0 of the block side edges, and an axial width Wa of the concave portions of the tire of 2 to 20 mm.

Due to the above arrangement of the present invention, it is possible to improve the wet performance while securing steering stability and while restricting decreases in noise performance to minimum.

DESCRIPTION OF THE PREFERRED EMBODIMENTS

Figure 1:
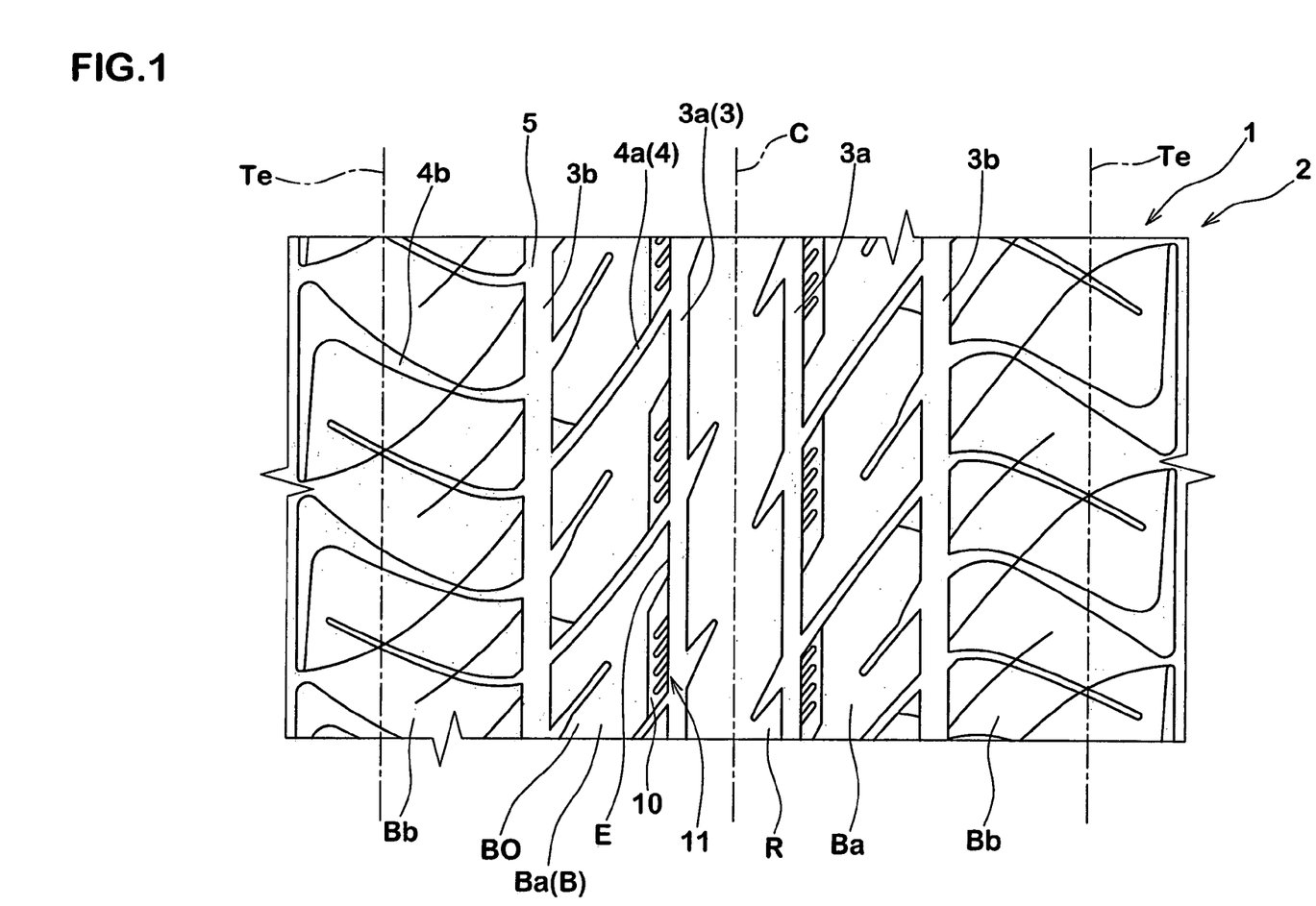
FIG. 1 is an exploded view in which one embodiment of a tread pattern of the pneumatic tire of the present invention is illustrated in exploded form.

One embodiment of the present invention will now be explained on the basis of illustrated examples thereof. FIG. 1 is an exploded view in which one embodiment of a tread pattern of the pneumatic tire of the present invention is shown.

In FIG. 1, the pneumatic tire 1 according to the present embodiment includes, at a tread portion 2 thereof, tread grooves 5 which are composed of circumferential main grooves 3 extending in a circumferential direction of the tire, and lateral grooves 4 in directions orthogonal thereto. With this arrangement, tread patterns of block type or block/rib type in which blocks B partitioned by the tread grooves 5 are disposed at intervals are formed at the tread portion 2.

The present example illustrates a case in which the circumferential main grooves 3 are composed of inner circumferential main grooves 3a that are disposed on each side of a tire equator C and outer circumferential main grooves 3b that are disposed outside thereof, and the lateral grooves 4 are composed of a plurality of inner lateral grooves 4a that passes over between the inner and outer circumferential main grooves 3a, 3b and a plurality of outer lateral grooves 4b that extends from the outer circumferential main grooves 3b over tread ends Te towards outside in an axial direction of the tire. With this arrangement, the tread portion 2 is formed with tread pattern of block/rib type composed of a central rib R extending on the tire equator C, rows of inner blocks Ba that are aligned in the tire circumferential direction on each side thereof, and rows of outer blocks Bb aligned in the tire circumferential direction further outside thereof.

In the present invention, at least a part of the blocks from among the blocks B is formed as concave blocks B0 in which stepped concave portions 10 are provided at block side edges E that face towards the circumferential main grooves 3.

Figure 2:
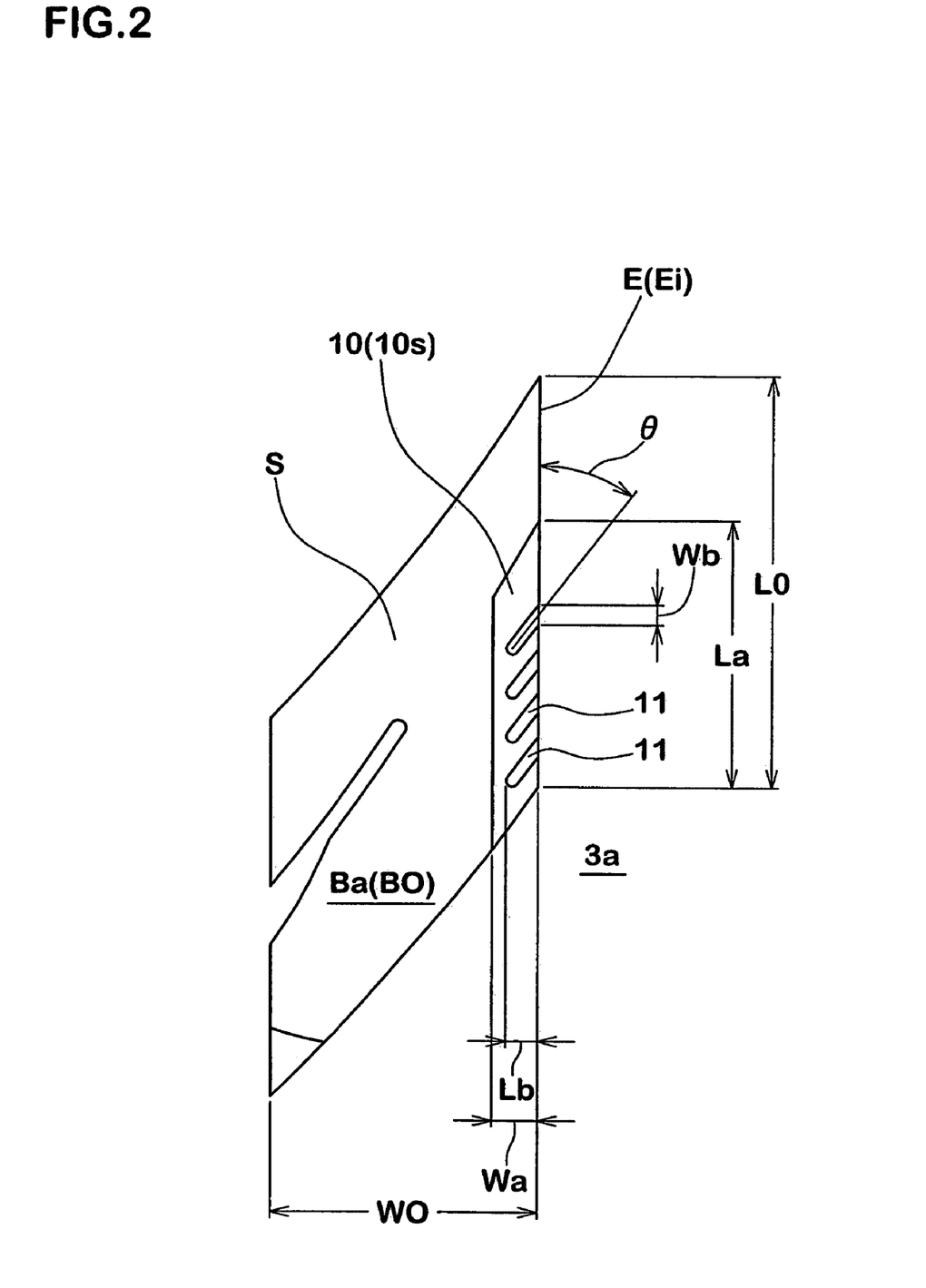
FIG. 2 is a plan view in which a concave block is illustrated in expanded form.
Figure 3:
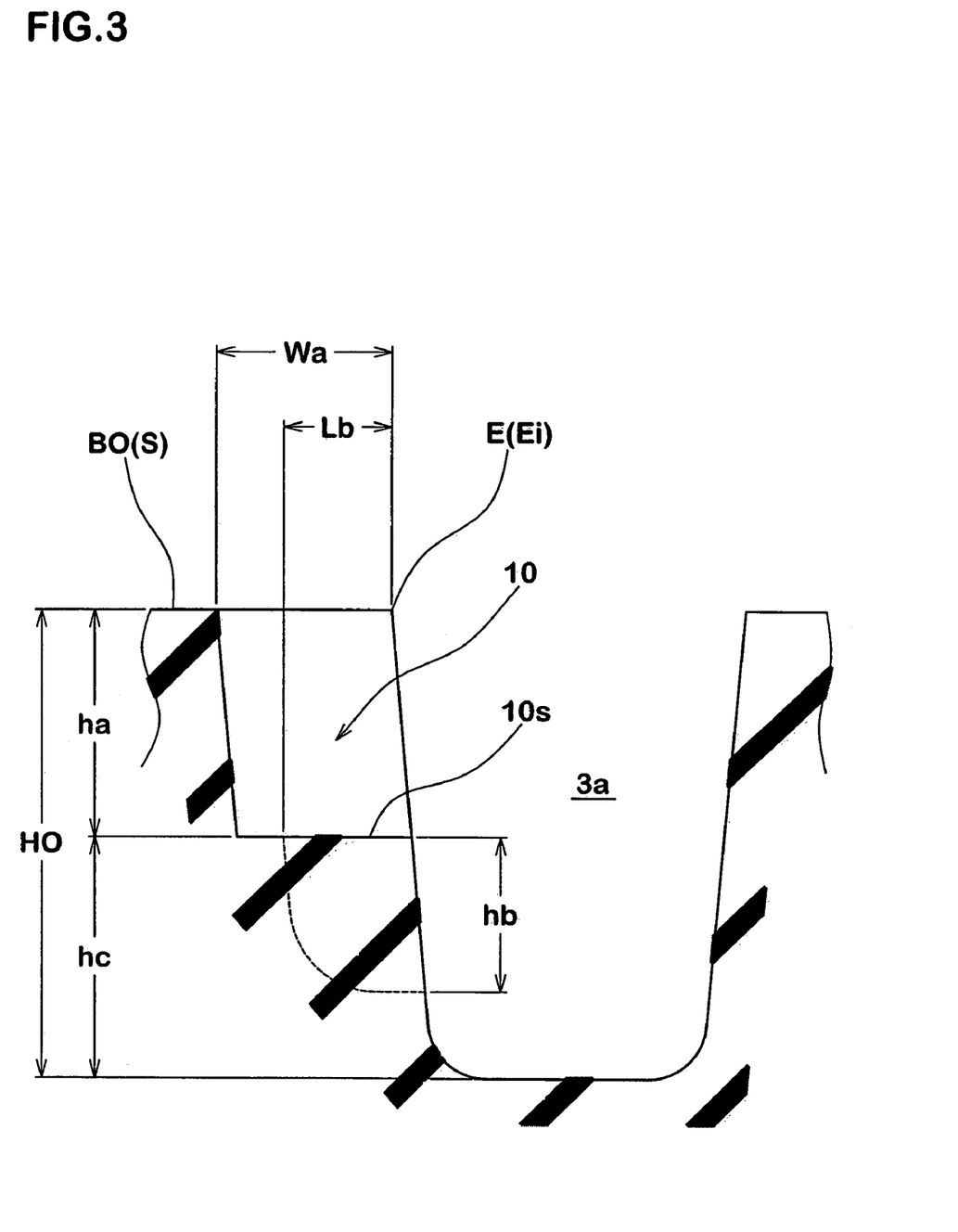
FIG. 3 is a sectional view in which a concave portion of the concave block is illustrated.
Figure 4:
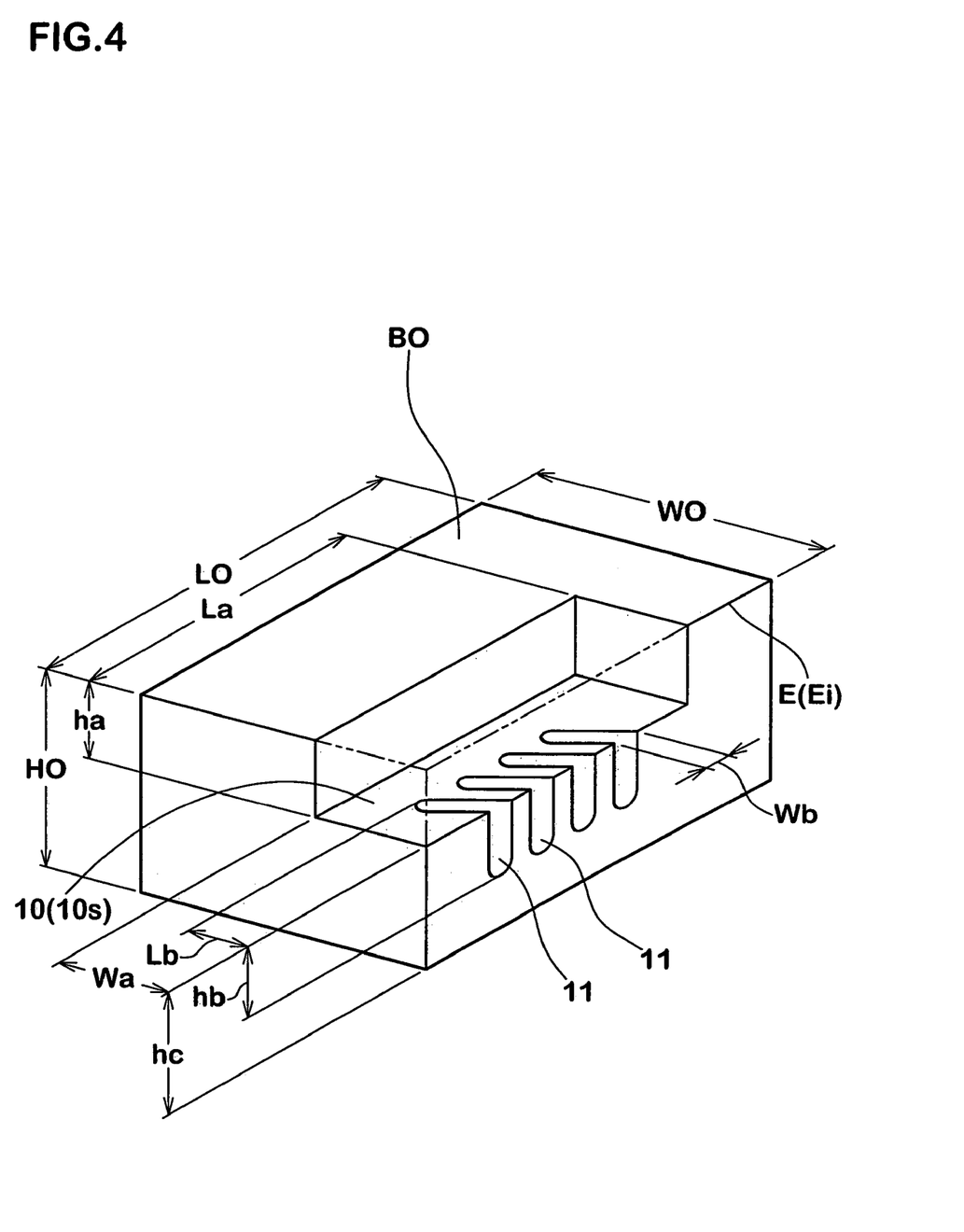
FIG. 4 is a perspective view conceptually illustrating the concave block.

The present example illustrates a case in which the inner blocks Ba are the concave blocks B0. As illustrated in FIGS. 2 to 4, the concave blocks B0 are arranged in that the concave portions 10 are formed at block side edges Ei inside in the tire axial direction (tire equator side) from among the block side edges E on each side thereof.

Each concave portion 10 is a stepped notch that extends along the block side edge Ei and that has a bottom surface 10s that is substantially parallel to a block top surface S. At the concave portion 10, a depth ha from the block top surface S to the bottom surface $10s$ is set in a range between 20 to 70% of a block height $H0$. A length La of the concave portion 10 in the tire circumferential direction is set in a range between 40 to 95% of a circumferential length $L0$ of the block side edges Ei while an axial width Wa of the concave portion 10 is set in a range between 2 to 20 mm.

Since such concave portions 10 substantially reduce the land ratio, which is a ratio of a surface area of the blocks B accounting in the total area of the tread surface (actual grounding area), it is possible to achieve improvements in the wet performance such as enhancing drainage properties. When performing running on a dry road surface, the concave portions 10 will disturb airflow passing through the circumferential main grooves $3a$. This arrangement makes it possible to restrict air core resonance and to improve the noise performance. Moreover, since the concave portions 10 are formed by notching a part of the block side edges Ei in a stepped manner, it is possible to hold down degradations in the block rigidity and thus to maintain steering stability.

For this purpose, the depth ha, the circumferential length La and the axial width Wa of the concave portions 10 are defined to be within the above-described ranges. When the depth ha is less than 20% of the block height $H0$, when the length La in the tire circumferential direction is less than 40% of the length $L0$ and when the axial width Wa is less than 2 mm, the concave portions 10 will be too small so that it is impossible to exhibit effects of improving the wet performance. On the other hand, when the depth ha is larger than 70% of the block height $H0$, when the length La in the tire circumferential direction is larger than 95% of the length $L0$ and/or when the axial width Wa is larger than 20 mm, the concave portions 10 will be too large. As a result, degradations in block rigidity will be remarkable so that it will be difficult to maintain the steering stability which leads to degradations in noise performance.

In view of these aspects, it is preferable to set, for the depth ha, its lower limit value to not less than 40% of $H0$ and its upper limit value to not more than 60%. As for the length La in the tire circumferential direction, the lower limit value is set to be not less than 50% of $L0$ and the upper limit value to be not more than 80% thereof. As for the axial width Wa, it is preferable to set the lower limit value to not less than 5 mm and the upper limit value to not more than 15 mm. In this respect, in view of the block rigidity, the axial width Wa is preferably held down to not more than 30% of the block width $W0$ of the block $B0$ in the tire axial direction.

In this respect, the concave portions 10 are preferably formed at block end edges Ei that face the circumferential main grooves 3 on the tire equator side (in the present example, the inner circumferential main grooves $3a$) at which large noises are generated and high drainage properties are required.

In the present example, a plurality of small grooves 11 are provided parallel to each other in the tire circumferential direction on the bottom surfaces $10s$ of the concave portions 10 in order to hold down degradations in wet performance after the concave portions 10 have worn out.

According to the present example, the small grooves 11 are string-like grooves extending at an angle $\theta$ of 30° to 90° with respect to the tire circumferential direction. In this case, it is preferable that one end of each small groove 11 opens at a groove wall surface that faces the circumferential main grooves $3a$. Each small groove 11 is arranged in that its small groove width Wb in the tire circumferential direction is in a range between 0.3 to 4.0 mm, its small groove length Lb in the tire axial direction is in a range between 0.5 to 1.0 times the axial width Wa of the concave portions 10, and its small groove depth hb from the bottom surface $10s$ is in a range between 0.3 to 1.0 times the height hc from the bottom surface $10s$ to the groove bottom of the circumferential main grooves $3a$.

Such small grooves 11 can improve the wet performance by performing cutting of water screens, absorption of water and drainage upon being exposed to the grounding surface when the concave portions 10 have worn out. Particularly when the one ends thereof are connected to the circumferential main grooves $3a$ as in the present example, the drainage properties are enhanced so that it is possible to achieve further improvements in wet performance. The small grooves 11 also improve the external appearance by being exposed to the grounding surface.

In this respect, the number n of small grooves 11 that are formed on the bottom surface $10s$ is preferably in the range of the following equation (1). With this arrangement, it is possible to secure sufficient intervals between the small grooves 11, 11 to thus reliably maintain the block rigidity.

$$n \leq La/(2 \times Wb) \quad (1)$$

Here, when the small groove width Wb is less than 0.3 mm, the small groove length Lb is less than 0.5 times the width Wa, and/or when the small groove depth hb is less than 0.3 times the height hc, effects of improving the wet performance will not be sufficiently exhibited. On the other hand, when the small groove width Wb is larger than 4.0 mm, the small groove length Lb is larger than 1.0 times the width Wa, and when the small groove depth hb is larger than 1.0 times the height hc, this will lead to degradations in block rigidity so that it will be impossible to secure steering stability. Particularly in the case where the small grooves 11 are string-like grooves as in the present example, it is preferable to set the upper limit value for the small groove width Wb to not more than 3.0 mm and the lower limit value for the small groove length Lb to not less than 0.7 times the width Wa.

Figure 5A:
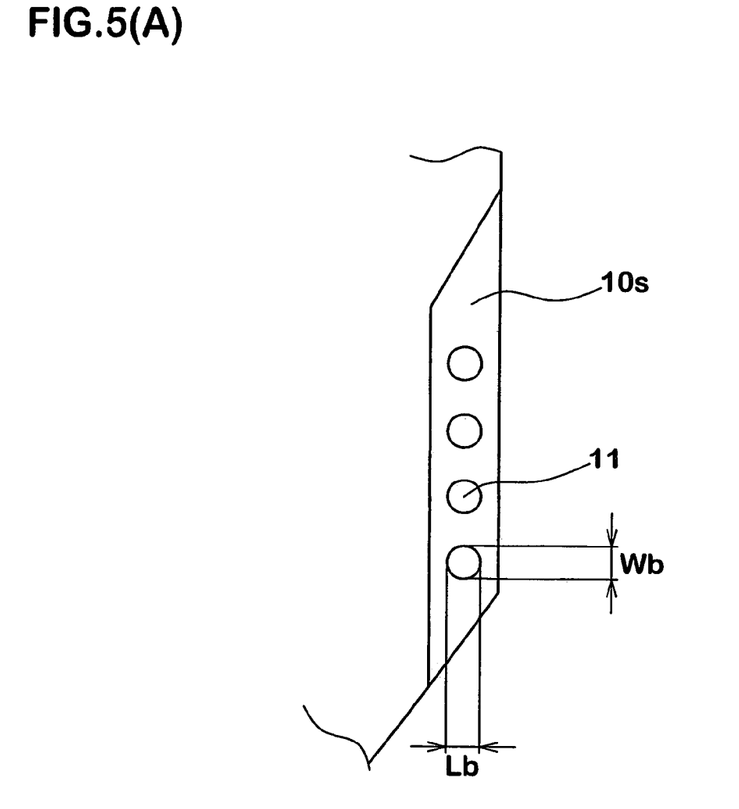
FIGS. 5(A) and 5(B) are a plan view and a sectional view, respectively, illustrating another example of small grooves.
Figure 5B:
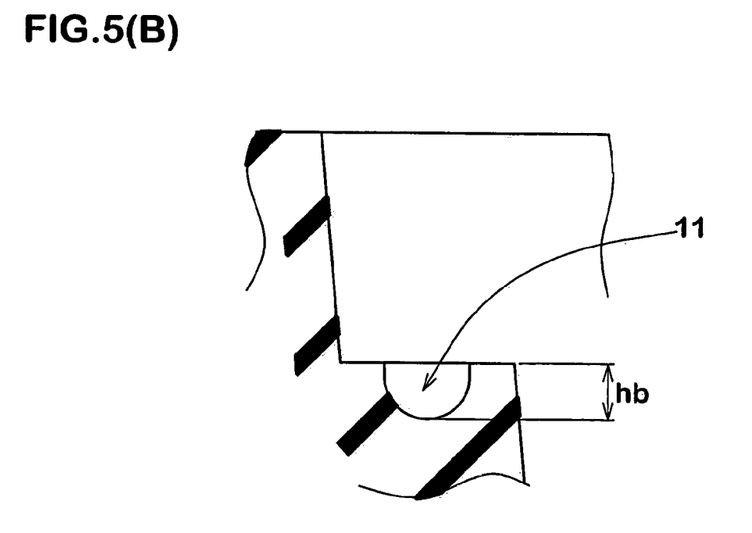
Figure 6A:
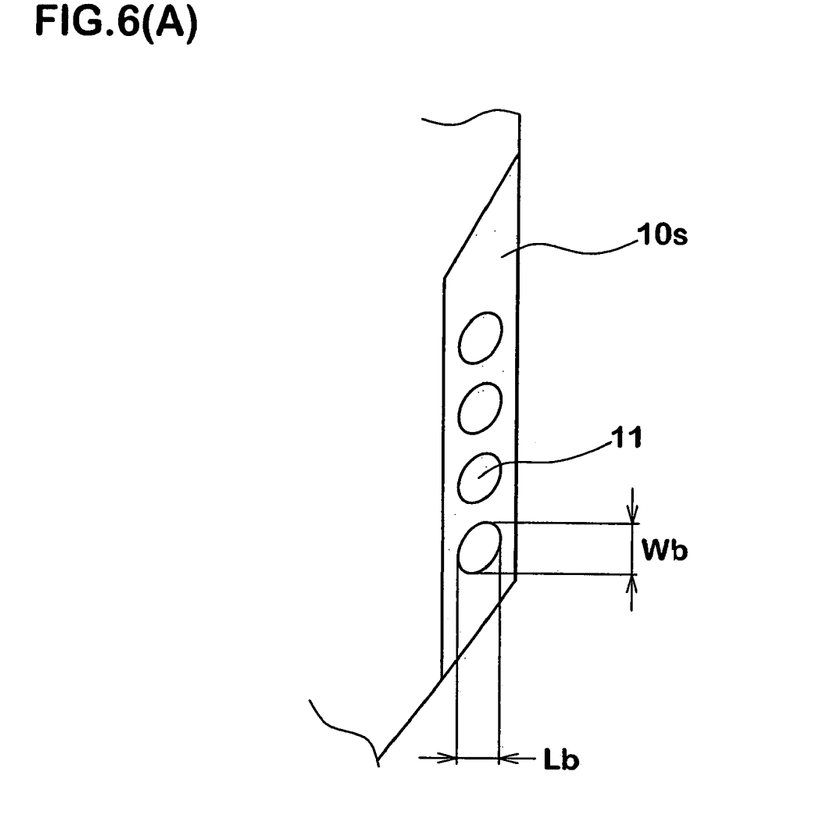
FIGS. 6(A) and 6(B) are a plan view and a sectional view, respectively, illustrating still another example of small grooves.
Figure 6B:
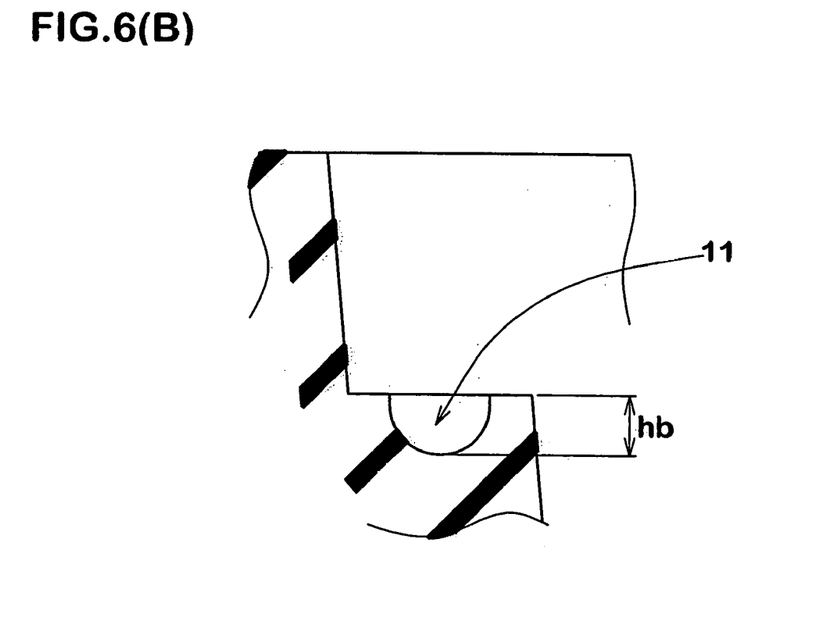

The small grooves 11 may alternatively be formed as hollow dimples in which openings on the bottom surfaces $10s$ do not go through to the circumferential main grooves $3a$ and are discontinuous within the bottom surface $10s$, as illustrated in FIGS. 5 and 6. It will similarly be possible to achieve improvements in wet performance and improvements in external appearance with this arrangement by performing cutting of water screens and absorption of water even though they are inferior to string-like grooves.

In this respect, it is possible to employ dimples, which are concaved in a columnar manner in the depth direction with aperture configurations being constant or which are concaved in a semi-spherical manner or in a cone-like manner, and the aperture configuration may be of a large variety of polygonal shapes besides a circular or elliptic one. In the case of such dimples, it is preferable to set a lower limit value for the small groove width Wb to not less than 1.0 mm and an upper limit value for the small groove length Lb to not more than 0.8 times the width Wa.

Figure 7:
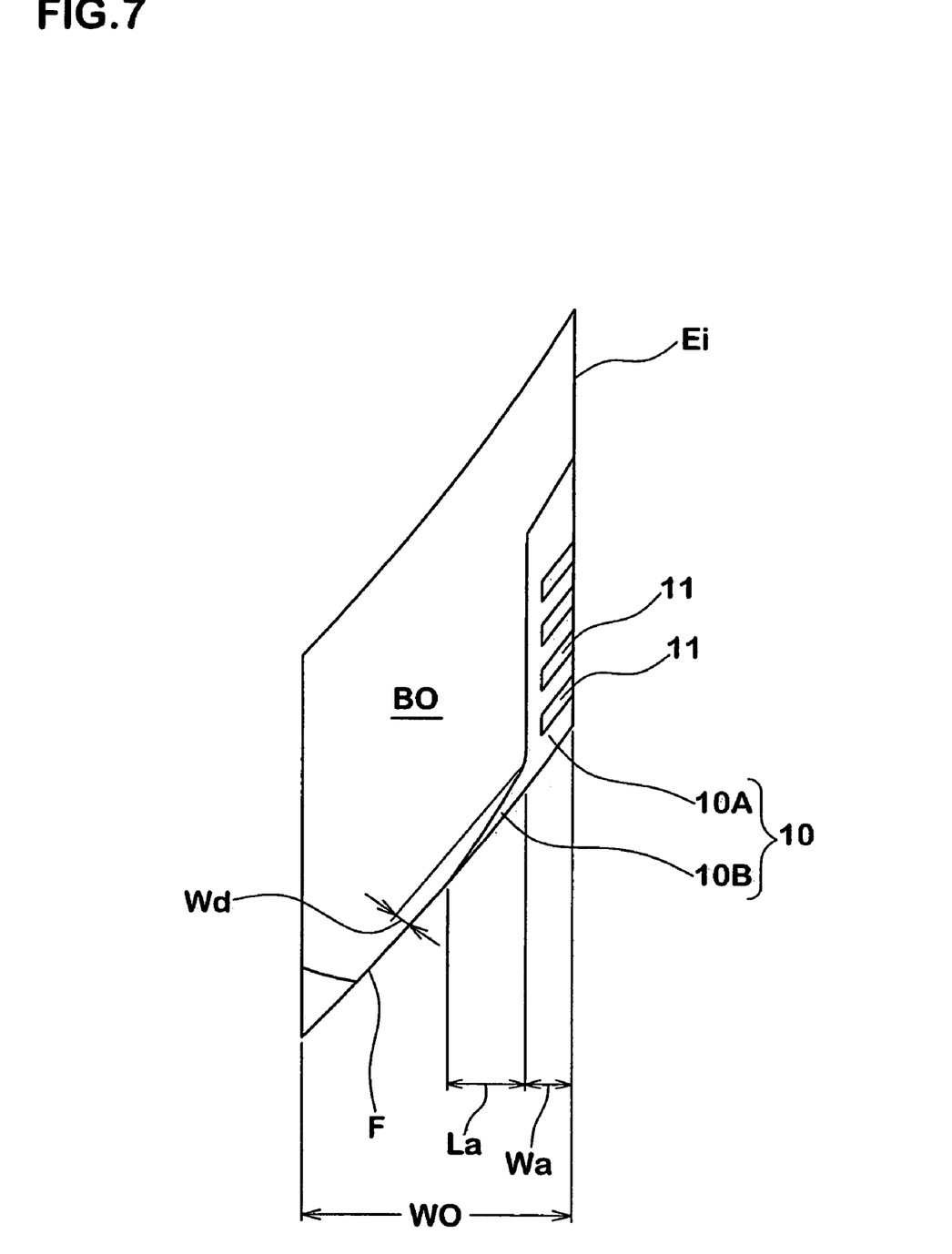
FIG. 7 is a plan view illustrating another example of the concave block.

The present example illustrates a case in which concave portions 10 are formed only at block side edges Ei as the concave blocks $B0$. However, it is also possible to provide, as illustrated in FIG. 7, a sub-portion 10B that extends along a block end edge F facing towards the lateral grooves 4 at a main portion 10A extending along the block side edge Ei as the concave portion 10. In such a case, it is preferable to limit a width Wd from the block end edge F of the sub-portion 10B to be smaller than the axial width Wa of the main portion 10A and a length Ld of the sub-portion 10B to be not more than 50% of the block width W0 in view of securing the block rigidity.

While a particularly preferred embodiment of the present invention has been explained in details so far, the present invention is not to be limited to the illustrated embodiment but may be carried out upon modifying the same into various forms.

EXAMPLES

Passenger car tires having a tire size of 195/65R15 that were based on the tread pattern as illustrated in FIG. 2 and having specifications according to Table 1 were manufactured by trial, and respective sample tires were tested for wet performance, noise performance and steering stability. In this respect, specifications other than those of Table 1 were substantially identical for all tires.

(1) Wet Performance:

Sample tires were attached to all wheels of a domestic FF passenger car (displacement 2,500 cc) to have a rim of 15×6JJ and an internal pressure of 220 kPa. The passenger car was then made to perform turning movements on a course with an asphalt road surface having a radius of 100 m, with a puddle having a water depth of 5 mm and a length of 20 m being formed thereon for measuring the generated maximum lateral G, which was indicated as an index with the Comparative Example 1 (in a fresh condition) being 100. The larger the value, the better the performance. In this respect, the wet performances were evaluated with fresh tires and at mid-terms of wear in which tires have worn out to the bottom surface of the concave portions.

(2) Noise Performance:

In car noise when running on a smooth dry asphalt road surface at a velocity of 100 km/h by using the above passenger car was evaluated through sensory evaluation of the driver in a ten-point method with the Comparative Example 1 being 7. The larger the index, the better the performance.

(3) Steering Stability:

Steering stability when running on a smooth dry asphalt road surface by using the above passenger car was evaluated through sensory evaluation of the driver in a ten-point method with the Comparative Example 1 being 7. The larger the index, the better the performance.

TABLE 1

|  | Comparative Example 1 | Example 1 | Example 2 | Example 3 | Example 4 | Comparative Example 2 |
|---|---|---|---|---|---|---|
| Concave portion | None | Present | Present | Present | Present | Present |
| Ratio (ha/H0) | — | 0.2 | 0.5 | 0.7 | 0.7 | 0.7 |
| Ratio (La/L0) | — | 0.4 | 0.7 | 0.9 | 0.9 | 1.0 |
| Width Wa <mm> | — | 2 | 10 | 20 | 20 | 20 |
| Small grooves | None | Present | Present | Present | None | Present |
| Configuration | — | String-like grooves | String-like grooves | String-like grooves | — | String-like grooves |
| Number of grooves formed (pieces) | — | 18 | 4 | 3 | — | 3 |
| Small groove width Wb <mm> | — | 0.3 | 2 | 4 | — | 4 |
| Ratio (Lb/Wa) | — | 0.5 | 0.8 | 0.8 | — | 0.8 |
| Ratio (hb/hc) | — | 0.1 | 0.3 | 1 | — | 1 |
| Wet performance |  |  |  |  |  |  |
| Brand-new condition | 100 | 108 | 111 | 115 | 114 | 118 |
| Mid-term of wear | 86 | 98 | 103 | 110 | 107 | 113 |
| Noise performance | 7 | 7⁻ | 7⁻ | 6.5 | 6.5 | 5 |
| Steering stability | 7 | 7⁻ | 7⁻ | 6.5 | 6.5 | 5.5 |

Since the Example tires are formed with concave portions as indicated in the table, it can be confirmed that the wet performance can be remarkably improved while maintaining the steering stability and holding down degradations in noise performance to minimum. Particularly in the case where small grooves are formed on the bottom surfaces of the concave portions, it can be confirmed that high wet performances can be secured also in the mid-term of wear.

What is claimed is:

1. A pneumatic tire in which blocks, which are partitioned through circumferential main grooves extending in a circumferential direction of the tire and lateral main grooves in directions orthogonal thereto, are disposed at intervals at a tread portion, wherein said circumferential main grooves include inner circumferential main grooves that are disposed on each side of a tire equator and outer circumferential main grooves that are disposed outside thereof, a portion between said inner circumferential main grooves is formed into a rib continuously extending in the circumferential direction of the tire, a portion between said inner circumferential main groove and said outer circumferential main groove is formed into an inner row of blocks aligned in the circumferential direction of the tire, and a portion between said outer circumferential main groove and a tread end is formed into an outer row of blocks aligned in the circumferential direction of the tire, only the blocks of said inner row are formed as concave blocks each having a stepped concave portion, said stepped concave portion extending not along a block side edge located outside in the tire axial direction but along a block side edge located inside in the tire axial direction, wherein the concave portion has a depth ha from a block top surface that corresponds to 20 to 70% of a block height H0 of the concave blocks, a length La of the concave portion in the tire circumferential direction that corresponds to 50 to 95% of a circumferential length L0 of the block side edge, and a width Wa of the concave portion in the tire axial direction of 5 to 20 mm, and a bottom surface of the concave portion is in parallel with the block top surface.

2. The pneumatic tire as claimed in claim 1, wherein the axial width Wa of the concave portion is not more than 30% of a block width W0 of the concave blocks in the tire axial direction.

3. The pneumatic tire as claimed in claim 1, wherein each concave portion is composed of a main portion extending along the block side edge and a sub-portion tat continues from the main portion and that extends along a block end edge that faces towards a lateral groove.

4. A pneumatic tire in which blocks, which are partitioned through circumferential main grooves extending in a circumferential direction of the tire and lateral main grooves in directions orthogonal thereto, are disposed at intervals at a tread portion, wherein said circumferential main grooves include inner circumferential main grooves that are disposed on each side of a tire equator and outer circumferential main grooves that are disposed outside thereof, a portion between said inner circumferential main grooves is formed into a rib continuously extending in the circumferential direction of the tire, a portion between said inner circumferential main groove and said outer circumferential main groove is formed into an inner row of blocks aligned in the circumferential direction of the tire, and a portion between said outer circumferential main groove and a tread end is formed into an outer row of blocks aligned in the circumferential direction of the tire, a stepped concave portion extends not along a block side edge located outside in the tire axial direction but along a block side edge located inside in the tire axial direction, wherein the concave portion has a dept ha from a block top surface that corresponds to 20 to 70% of a block height H0 of the concave blocks, a length La of the concave portion in the tire circumferential direction that corresponds to 50 to 95% of a circumferential length L0 of the block side edge, and a width Wa of the concave portion in the tire axial direction of 5 to 20 mm, a bottom surface of the concave portion is in parallel with the block top surface, the bottom surface of the concave portion is provided with a plurality of string-like grooves, the lateral main grooves are inclined with respect to the tire axial direction, and said plurality of string-like grooves are arranged in parallel to the lateral main grooves disposed between said inner circumferential main grooves and said outer circumferential main grooves.

5. The pneumatic tire as claimed in claim 4, wherein each string-like groove is arranged in that one end thereof opens at a groove wall surface facing the circumferential main grooves.

6. The pneumatic tire as claimed in claim 4, wherein each string-like groove has a groove width Wb in the tire circumferential direction of 0.3 to 3.0 mm, a groove length Lb in the tire axial direction of 0.5 to 0.7 times the groove width Wa, and a groove depth hb from the bottom surface of 0.3 to 1.0 times the height he from the bottom surface to a groove bottom of the circumferential main grooves.

7. The pneumatic tire as claimed in claim, wherein the number n of the string-like grooves satisfies the following equation (1), namely $$n \leq La/(2 \times Wb) \quad (1).$$

8. A pneumatic tire in which blocks, which are partitioned through circumferential main grooves extending in a circumferential direction of the tire and lateral main grooves in directions orthogonal thereto, are disposed at intervals at a tread portion, wherein said circumferential main grooves include inner circumferential main grooves that are disposed on each side of a tire equator and outer circumferential main grooves that are disposed outside thereof, a portion between said inner circumferential main grooves is formed into a rib continuously extending in the circumferential direction of the tire, a portion between said inner circumferential main groove and said outer circumferential main groove is formed into an inner row of blocks aligned in the circumferential direction of the tire, and a portion between said outer circumferential main groove and a tread end is formed into an outer row of blocks aligned in the circumferential direction of the tire, only the blocks of said inner rows are formed as concave blocks each having a stepped concave portion, said stepped concave portion extending not along a block side edge located outside in the tire axial direction but along a block side edge located inside in the tire axial direction, wherein the concave portion has a depth ha from a block top surface that corresponds to 20 to 70% of a block height H0 of the concave blocks, a length La of the concave portion in the tire circumferential direction that corresponds to 50 to 95% of a circumferential length L0 of the block side edge, and a width Wa of the concave portion in the tire axial direction of 5 to 20 xmn, a bottom surface of the concave portion is in parallel with the block top surface, and only the bottom surface of the concave portion is provided with a plurality of dimples aligned with each other in the tire circumferential direction.

9. The pneumatic tire as claimed in claim 8, wherein each dimple has a width Wb in the tire circumferential direction of 1.0 to 4.0 mm, a length Lb in the tire axial direction of 0.05 to 0.8 times the width Wa, and a groove depth hb from the bottom surface of 0.3 to 1.0 times the height hc from the bottom surface to a groove bottom of the circumferential main grooves.

* * * * *